United States Patent [19] [11] 4,130,314
Storm [45] Dec. 19, 1978

[54] PICKER AND LOADER FOR SOFT GOODS

[76] Inventor: Donald W. Storm, 5857 Upper Straits Blvd., Orchard Lake, Mich. 48033

[21] Appl. No.: 827,453

[22] Filed: Aug. 25, 1977

[51] Int. Cl.² .............................................. B25B 9/00
[52] U.S. Cl. .................................................. 294/100
[58] Field of Search .................. 294/100, 88, 115, 61, 294/50.8; 214/1 B, 1 BB

[56] References Cited

U.S. PATENT DOCUMENTS

| 2,049,298 | 7/1936 | Jung | 294/50.8 |
| 2,541,144 | 2/1951 | Anderson | 294/61 |
| 2,786,223 | 3/1957 | Ziskind | 294/100 |

Primary Examiner—James B. Marbert
Attorney, Agent, or Firm—Cullen, Sloman, Cantor, Grauer, Scott & Rutherford

[57] ABSTRACT

A picker-loader formed of a number of flexible wires, each secured at one end to a moveable plate, extend through and are guided by passages formed in a sleeve which is axially aligned with the plate, so that the free ends of the wires may be extended outwardly of or be retracted relative to their adjacent sleeve end. The sleeve, plate and wires are mounted within a casing which is fastened upon a support holding a number of such pickers for simultaneous actuation. Thus, the free ends of the wires, when extended outwardly, embed in the soft goods, as for example, baked goods, for temporarily fastening such goods to the picker so that the goods may then be moved with the picker. Retraction of the wires release the goods from the picker.

8 Claims, 8 Drawing Figures

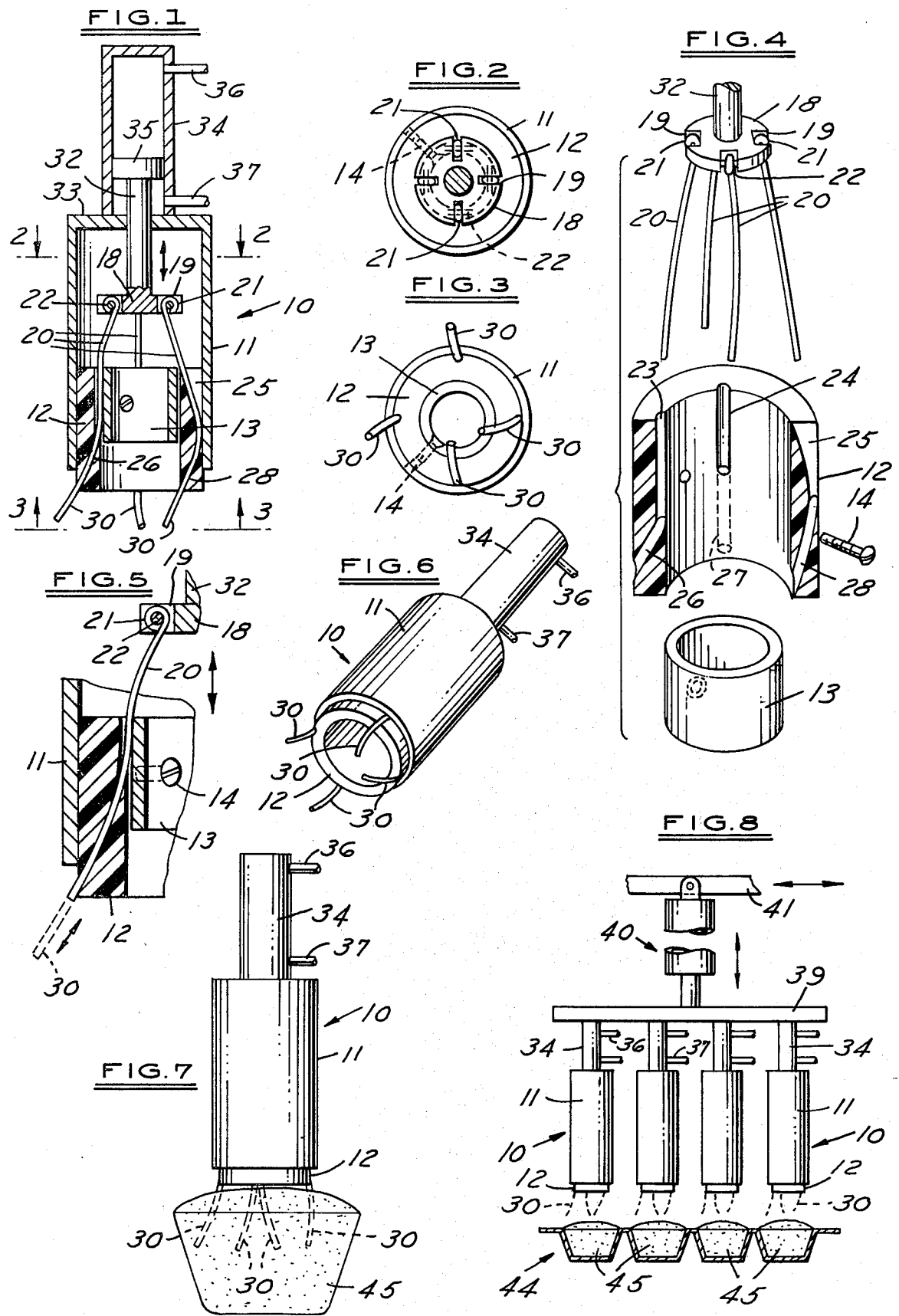

PICKER AND LOADER FOR SOFT GOODS

BACKGROUND OF INVENTION

Certain types of soft goods are difficult to pick up and move about with mechanical contrivances. Particularly in the high production bakery industry, it has been difficult in the past to utilize mechanical transfer devices for picking up and moving about high volume baked goods, such as muffins, pastry items and the like which are baked in large quantities in pans or on belts within ovens, but thereafter must be handled manually.

Hence, the invention herein is concerned with a mechanical picker, that is, a device which provides extensible and retractable wires which can penetrate soft goods, such as baked items, for temporarily holding such items so that they may be picked up and transferred or loaded in other locations. This makes it possible to pick up relatively small items such as muffins, buns, and the like as well as pastry items and the like which have been iced and which otherwise would have to be manually handled.

The picker lends itself to being assembled in groups of pickers which may simultaneously operate to move a quantity of baked goods at one time, such as for example to unload a cupcake tray and permit the movement of the cupcakes simultaneously into a packaging area.

In contrast with prior art attempts to pick up and move such types of baked goods which are easily damaged, particularly when hot or warm, the concept here relates to the penetration of the baked goods with thin wires which then serve to support same until deliberate release or retraction. The picker here also lends itself for use in other places where similar types of goods are found which would otherwise be handleable only manually or with more complicated types of handling devices.

SUMMARY OF INVENTION

The invention herein contemplates a picker formed of a series of flexible, resilient wires connected at one end to a moveable plate and extending through grooves or channels in a guide sleeve so that upon endwise movement of the wires, they can be extended through the sleeve so that their free ends can embed within soft goods, or alternatively can be retracted within the sleeve for releasing the soft goods. The grooves and guide passages formed within the sleeve are so arranged that each wire tends to extend from the sleeve in a different direction from its other wires thereby making is possible to lock the goods to the picker until deliberate retraction of the wires.

The invention herein also contemplates forming the sleeve out of a plastic material which tends to be relatively slippery so as to inherently provide lubrication for movement of the wire relative to the sleeve and also to provide a self-cleaning effect particularly where the device is used for baked goods. This construction provides a simple structure which is easily disassembled for cleaning and which has relatively few moving parts.

The picker herein is intended to be mounted within a relatively small casing which in turn can be mounted through a piston-cylinder actuating means to supports so that the pickers can be used in groups, as for example a group of six, for picking up a predetermined quantity of items and thereby moving the items to another place. By way of example, a group of six pickers can pick up six cupcakes from a cupcake baking pan and the pickers can be simultaneously moved with their support to a location where the cupcakes can be deposited into a box for packaging.

The thin wires which may be similar to what is called "piano wire" provide a sanitary, quick operating and inexpensive means for locking the picker to the goods since the wires will extend into the goods at various angles and thereby will not release until the wires are retracted back into the sleeve through which they are extended.

One object of the invention herein is to provide such a simplified, compact, picker mechanism which can lock to an easily damageable item such as a baked item, which picker can be used as a component in packaging equipment for lifting and loading the item in a variety of ways, including turning the item sideways, or at an angle, etc. Such picker lends itself to a variety of uses in a variety of types of loading machines such as is used in the bakery industry.

These and other objects and advantages of this invention will become apparent upon reading the following description, of which the attached drawings form a part.

DESCRIPTION OF DRAWINGS

FIG. 1 is an elevational cross sectional view of the picker herein.

FIG. 2 is a cross sectional view taken in the direction of arrows 2—2 of FIG. 1.

FIG. 3 is a bottom end view taken in the direction of arrows 3—3 of FIG. 1.

FIG. 4 is a disassembled, perspective, partially cross sectioned, view of the essential parts making up the picker.

FIG. 5 is an enlarged fragmentary view of one of the picker wires and its guide passage ways.

FIG. 6 is a perspective view showing the wires extended.

FIG. 7 is an elevational view showing the picker carrying a baked item, such as a cupcake.

FIG. 8 is a schematic view, partially in cross section, showing a series of pickers arranged for picking cupcakes out of a baking pan.

DETAILED DESCRIPTION

The picker generally designated as 10, is formed of an outer tubular casing 11 containing a thick walled plastic sleeve 12 within which is positioned an inner retainer sleeve 13 fastened to the plastic sleeve and to the tubular casing by means of a screw 14.

Within the casing, above the plastic sleeve, is located a disk or plate 18 having a number of notches 19. A series of wires 20 are formed with bent eyelet ends 21, each arranged within one of the notches 19 and secured therein by means of a suitable pin 22.

The inner face of the plastic sleeve 12 is formed with grooves 23 and 24 of differing lengths and also, or alternatively, milled slots 25. Different length and angled drilled holes 26, 27 and 28 communicate with such grooves and slots as is illustrated in FIG. 4.

The wires 20 extend through the grooves, slots and holes so that their lower or inner or free ends 30 form grasping or embedding portions for embedding into the soft goods to be picked.

A piston rod 32 is fastened to the plate 18 and extends through the casing cover 33 into a cylinder 34 where it is connected to a piston 35. Air inlet pipes 36 and 37 on the opposite faces of the piston carry compressed air or hydraulic fluid to move the piston axially and thereby move the piston rod 32 and also the plate 18. Conventional controls may be provided for actuating the compressed air when desired.

As shown in FIG. 8, a group of pickers may be aligned with their cylinders 34 secured to a support bar 39, which in turn is connected by a suitable pneumatic or hydraulic cylinder 40, or other raising and lowering mechanism, to a slide bar 41 for transverse movement of the group of pickers. The group is located above a baking tray 44, shown in cross section, for baking cupcakes 45, by way of example.

The operation of the pickers is as follows: Normally, the pistons 35 are elevated so that the wires 20 are retracted upwardly within the tubular casing 11 and the free ends of the wires 30 are retracted within the holes 26-27-28 of the plastic sleeve 12. When the picker is located above the soft goods, such as the cupcakes illustrated, compressed air entering into the pipes 36 causes the piston 35 to move downwardly, thereby moving the piston rod 32 downwardly. This moves the plates 18 downwardly and causes the wires to bend and flex and move so that their free ends 30 extend outwardly of the lower end of the picker and the sleeve. Because of the length and directions of the grooves, slots and drilled holes through which the various wires extend, the wires tend to extend downwardly at odd angles relative to each other. Thus, when they enter into or impale the baked goods, such as the cupcakes 45 (see FIG. 7) the differing angles of the wires cause the goods to lock to the picker. The goods remain locked to the picker until such time as the wires are retracted by supplying compressed air into the pipes 37 to return the piston 32 upwardly and thereby reverse the movement of the wires.

Where the picker is to be used in the bakery industry, for sanitary purposes and to facilitate ease of cleaning of the parts, it is preferable to form the casing and the inner sleeve 13 of stainless steel or the like material. However, the plastic 12, is preferably formed of a slippery type of plastic, such as a nylon or teflon or the like which is non-toxic and functions to permit easy movement of the wires therethrough. A number of different types of suitable plastics are available on the market for this purpose and are known to those skilled in the art.

By fastening the inner sleeve, the plastic sleeve and the casing together with a simple screw, the three can be disassembled rapidly for cleaning purposes. The screw shown in FIG. 4, could be interchanged with a simpler thumb screw extending from the outside of the casing inwardly to thus simplify disassembly.

The number of wires may vary. The drawings illustrate four wires, showing three in the cross sectional views. However the number of wires can be increased, as needed or as few as two or three can be used. The number depends upon the use intended.

The wires themselves are made of flexible and resilient steel wire, such as so-called "piano wire" whose thickness may vary, but which typically may be in the range of about 1/32 of an inch or less.

FIG. 8 schematically shows the gang or group of pickers used for engaging, lifting and moving transversely a group of baked items. The number and arrangement of the pickers can be varied for this purpose and the support to which the pickers are connected can be angularly adjustable so as to pick up items located on a horizontal sheet and turn the items 90° or so for packaging purposes. Since the picker may be used on a variety of different types of transfer devices or mechanisms, the description of the slide bar, lift cylinder 40 and support 39 is given only in general terms, leaving it to those skilled in the art to select the appropriate mechanisms as needed for various applications of the picker herein.

Having fully described an operative embodiment of this invention, I now claim:

1. A soft goods picker comprising:

a sleeve having an inner end and an outer end;

elongated, flexible wires extending through the sleeve and through guide passages formed within the sleeve, said wires having inner ends connected to reciprocating means for moving the wires axially of the sleeve, with the wires being of sufficient length to extend outwardly of the outer sleeve end upon reciprocation in one direction and to be retracted within the sleeve upon reciprocation in the other direction;

said guide passages being angled so that each wire extends in a different direction outwardly of the outer end of the sleeve;

whereby the outer ends of said wires may penetrate and be withdrawn from a soft goods item for picking and moving such item.

2. A device as defined in claim 1 above, and a retainer sleeve arranged within said first mentioned sleeve, and said wires extending between the two sleeves, for guiding the wires in a generally axial direction of movement.

3. A device as defined in claim 2 above, and a casing surrounding the first mentioned sleeve and reciprocating means, and said reciprocating means including a plate member to which said wire ends are connected and a piston rod connected to said plate member and power means for actuating the piston rod.

4. A soft goods picker comprising a sleeve having an inner end and an outer end;

elongated flexible picker members extending through and being endwise moveable relative to the sleeve, and having inner ends mounted upon a reciprocable means located near said sleeve inner end, with the outer ends of said members being extendable outwardly of said sleeve upon movement of said reciprocable means in one direction and being substantially retracted within the sleeve upon movement of the reciprocable means to the opposite, inward direction;

and said sleeve providing guide means for guiding the endwise movement of said members, said guide means comprising angled passages so that each wire extends in a different direction outwardly of the outer end of said sleeve;

whereby the outer, free ends of said members may extend outwardly and impale an item to be picked, and thereafter may be retracted to release said item.

5. A device as defined in claim 4 above, and said picking means extending between said sleeve and a retainer sleeve arranged within said first mentioned sleeve, and the two sleeves being fastened together within a surrounding casing having an open end portion through which said picker members are extend and retracted.

6. A soft goods picker comprising a cylindrically shaped casing having an open end;

a cylindrically shaped tube arranged within the casing at the open end thereof;

a moveable plate mounted within the casing for axial movement relative thereto;

a number of thin, flexible wires each having one end secured to the plate and extending through angled passages formed in the tubular sleeve, outwardly in a generally axial direction, of the open end of the casing so that each wire extends in a different direction outwardly of the open end of said casing;

means for moving the plate towards and away from the open end of the casing for thereby extending and retracting respectively the free ends of the wires relative to the casing for engaging and impaling an item to be fastened to and moved by the picker.

7. A construction as defined in claim 6 above, and including an inner, retainer sleeve fastened within the said first mentioned sleeve for guiding and engaging a portion of the wires as they extend between both of the sleeves for a portion of their length.

8. A construction as defined in claim 7 above, and wherein said passages formed in the sleeve are arranged non-parallel to the axis of the sleeve, but in a general axial direction, with each of the passages being angled differently then the other passages wherein the wires each extend at a different angle outwardly of the sleeve.

* * * * *